United States Patent
Keshtkarjahromi

(10) Patent No.: US 11,595,421 B2
(45) Date of Patent: Feb. 28, 2023

(54) METHOD AND SYSTEM THAT DETERMINE MALICIOUS NODES IN A DISTRIBUTED COMPUTATION NETWORK

(71) Applicant: Seagate Technology LLC, Fremont, CA (US)

(72) Inventor: Yasaman Keshtkarjahromi, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 185 days.

(21) Appl. No.: 17/069,077

(22) Filed: Oct. 13, 2020

(65) Prior Publication Data

US 2021/0044609 A1 Feb. 11, 2021

(51) Int. Cl.
*H04L 9/40* (2022.01)
*H04L 41/046* (2022.01)
(Continued)

(52) U.S. Cl.
CPC ............ *H04L 63/1425* (2013.01); *G06F 8/61* (2013.01); *G06F 9/44526* (2013.01); *H04L 41/046* (2013.01); *H04L 41/0893* (2013.01); *H04L 41/16* (2013.01); *H04L 63/08* (2013.01); *H04L 63/102* (2013.01); *H04L 63/104* (2013.01);
(Continued)

(58) Field of Classification Search
CPC ............... H04L 63/1425; H04L 41/046; H04L 41/0893; H04L 41/16; H04L 63/08; H04L 63/102; H04L 63/104; H04L 63/1416; H04L 63/1441; H04L 63/205; H04L 67/10; H04L 67/34; H04L 41/12; H04L 41/145; H04L 63/145; H04L 41/0895;
(Continued)

(56) References Cited

U.S. PATENT DOCUMENTS

| | | | |
|---|---|---|---|
| 8,132,073 B1 * | 3/2012 | Bowers ............... | G06F 21/6227 713/160 |
| 8,706,914 B2 * | 4/2014 | Duchesneau ........... | H04L 63/20 709/250 |

(Continued)

OTHER PUBLICATIONS

Keshtajarhahromi et al., "Secure Coded Cooperative Computation at the Heterogeneous Edge against Byzantine Attacks", arXiv:1908.0538v1, Aug. 15, 2019, 11 pages.

*Primary Examiner* — J. Brant Murphy

(74) *Attorney, Agent, or Firm* — Mueting Raasch Group

(57) ABSTRACT

A computation is divided into computation tasks that are sent to worker nodes and distributed results are received in response. A redundant subtask is sent to each of the worker nodes, the redundant subtask being a random linear combination of the computation tasks sent to others of the worker nodes. The worker nodes perform the redundant subtasks to produce redundant results. The redundant result of each worker node is combined with distributed results of others of the worker nodes to determine whether one or more of the worker nodes are acting maliciously. Optionally, the worker nodes can be initially evaluated for trustworthiness using a homomorphic hash function applied to an initial computation task and applied to results of the initial tasks. If the results of both hash functions match, then the worker nodes are considered trustworthy and can be used for subsequent computations with redundant subtasks as described above.

20 Claims, 5 Drawing Sheets

(51) Int. Cl.
*H04L 41/16* (2022.01)
*G06F 9/445* (2018.01)
*G06F 8/61* (2018.01)
*H04L 41/0893* (2022.01)
*H04L 67/10* (2022.01)
*H04L 67/00* (2022.01)
*H04L 41/12* (2022.01)
*H04L 41/14* (2022.01)

(52) U.S. Cl.
CPC ...... *H04L 63/1416* (2013.01); *H04L 63/1441* (2013.01); *H04L 63/205* (2013.01); *H04L 67/10* (2013.01); *H04L 67/34* (2013.01); *H04L 41/12* (2013.01); *H04L 41/145* (2013.01)

(58) Field of Classification Search
CPC ......... H04L 41/122; H04L 41/40; G06F 8/61; G06F 9/44526; G06F 21/552; G06F 21/554
See application file for complete search history.

(56) References Cited

U.S. PATENT DOCUMENTS

| | | | | |
|---|---|---|---|---|
| 10,049,017 B2* | 8/2018 | Karame | ................ | G06F 11/182 |
| 10,503,614 B2* | 12/2019 | Abraham | .............. | H04L 9/0618 |
| 10,536,167 B2* | 1/2020 | Pavlov | ................. | G06F 16/137 |
| 2019/0372768 A1* | 12/2019 | Veeningen | ............... | H04L 9/14 |

* cited by examiner

METHOD AND SYSTEM THAT DETERMINE MALICIOUS NODES IN A DISTRIBUTED COMPUTATION NETWORK

SUMMARY

The present disclosure is directed to a method and system that determine malicious nodes in a distributed computation network. In one embodiment, a method involves, from a supervisor computing node, dividing a computation into a plurality of computation tasks that can be distributed to other computing entities. The computation tasks are sent to a plurality of worker computation nodes and distributed results are received in response thereto. A redundant subtask is sent to each of the worker computation nodes that is a random linear combination of the computation tasks sent to others of the worker computation nodes. The worker computation nodes perform the redundant subtasks to produce redundant results that are sent to the supervisor computing node in response thereto. At the supervisor computing node, for each of the worker computation nodes, the redundant result of the worker computation node is combined with distributed result of the worker computation node to determine that one or more of the worker computation nodes are acting maliciously. The one or more worker computation nodes are removed from further computations for the supervisor computing node based on the nodes acting maliciously.

In another embodiment, a supervisor computing node divides a matrix into a plurality of submatrices $A_n$ each targeted for a respective one of a plurality of worker computation nodes for multiplication with a vector x. A random coefficient $c_i$ is assigned to each row $a_i$ of the matrix by the supervisor node. For each node $w_n$ of the worker computation nodes, the supervisor node performs: 1) using the random coefficients, forming a random linear combination $b_n$ of rows $a_m$ of the submatrices $A_m$ sent to others of the worker computation nodes $w_m$, m≠n; 2) sending to $w_n$ the $A_n$ the $b_n$, and the vector x; 3) instructing the node $w_n$ to: multiply $A_n$ with x to obtain a distributed result $y_n$; and to multiply $b_n$ with x to obtain a redundant result $d_n$; 4) receiving the $y_n$ and the $d_n$, from $w_n$; and 5) combining the $d_n$, with the $y_n$ to obtain a check value $f_n$ for $w_n$. Based on the check values agreeing with one another, validating the plurality of worker computation nodes as trustworthy for further computations on behalf of the supervisor computing node.

In another embodiment, worker nodes are selected from a plurality of computing nodes based on a first distributed calculation, the first distributed calculation involves: 1) dividing an initial computation into a plurality of initial computation tasks; 2) sending the initial computation tasks to the plurality of computing nodes, the plurality of computing nodes performing the initial computation tasks to obtain initial results; and 3) for each computing node of the plurality of computing nodes, determining a first result of a homomorphic hash function applied to the available node's initial computation task and a second result of the homomorphic hash function applied to the available node's initial results; and 4) selecting the worker nodes from those computing nodes whose first result matches the second result.

In this embodiment, a second distributed calculation is performed with the worker nodes, the second distributed calculation involving: 1) dividing the second distributed calculation into plurality of computation tasks; 2) sending, to each of the worker nodes, one of the computation tasks and a redundant subtask, each redundant subtask for each worker comprising a random linear combination of the computation tasks sent to others of the worker nodes; 3) receiving redundant results in response to the redundant subtasks and distributed results in response to the computation tasks; 4) for each of the worker nodes, combining the redundant result of the worker node with the distributed results of the worker node to determine whether the worker node is acting maliciously; and 5) removing the worker computation nodes that are acting maliciously from performing further computations These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
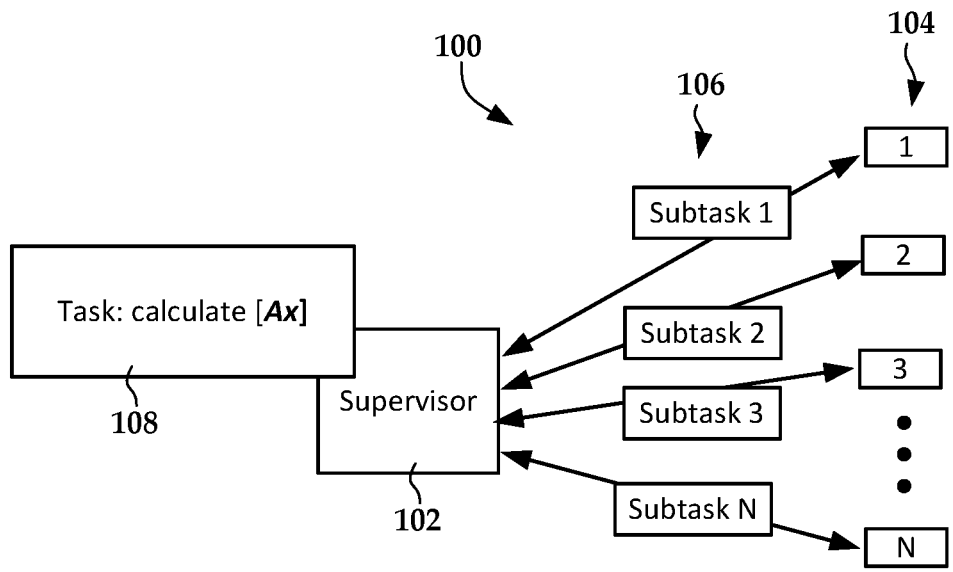
FIGS. 1 and 2 are block diagrams of distributed computation systems according to example embodiments.

The present disclosure generally relates to distributed computation systems. With the emerging applications like healthcare, smart cities, and smart homes, there is a growing need for real time data analytics. Offloading computation tasks to the cloud for these types of applications may not always be viable due to high latency and cost. An alternative approach is to perform the computation at the edge. Generally, edge devices are network-connected, low-powered computation devices that may include, but are not limited to, routers, wireless access points, cameras, media-players, home assistants, file servers, robots, smart appliances, smart phones, tablets, etc., that are becoming ubiquitous in modern Internet-connected homes, schools, businesses, etc.

Because edge devices are limited in terms of computational power compared to the cloud, leveraging distributed edge computing may involve dividing a computationally intensive task into sub-tasks. Each sub-task is offloaded to an available edge device for computation. However, considering the limited security power of edge devices, they are vulnerable to attacks.

One such attack is a Byzantine attack, where the malicious edge devices corrupt the assigned sub-tasks. Therefore, it is prudent to check the correctness of the sub-tasks' results before using the results (and the node that provided the results) for further analysis or decision making. In this work, a matter called compute provenance in distributed edge computing is considered. One example focuses on compute provenance of linear computation tasks such as matrix-vector multiplication, where the size of the matrix and vector is large. The motivation for focusing on matrix-vector multiplication stems from emerging machine learning applications, where matrix-vector multiplication is the building block of applied algorithms and the most computationally intensive operation (e.g., in deep neural networks with large number of hidden units). Embodiments described below can be used to develop efficient compute provenance for distributed matrix-vector multiplication, as well as for other computing tasks that can be similarly partitioned for distributed calculation.

In this work, two approaches are discussed that address Byzantine attacks in distributed edge computing applications. The first approach, which is called CryptoComP, is a cryptographic approach based on homomorphic hash functions that is proposed in Y. Keshtkarjahromi, R. Bitar, V. Dasari, S. E. Rouayheb, and H. Seferoglu, "Secure coded cooperative computation at the heterogeneous edge against byzantine attacks," in 2019 IEEE Global Communications Conference (Globecom), December 2019, (hereinafter "Keshtkarjahromi et al.") which is hereby incorporated by reference. The second approach, called InfoComP, is an information-theoretic approach that is detailed in the following sections. In the following sections, each approach is described including the system model requirements for each. An example system model is also described in which these two approaches can be efficiently combined to detect Byzantine attacks.

Section A. CryptoComP: Cryptographic Compute Provenance.

This approach which is proposed in Keshtkarjahromi et al., provides a compute provenance method that can be applied to a supervisor/worker system setup. One defining feature of this approach is providing a variable parameter that provides a trade-off between complexity and probability of attack detection.

Section A1. System Model

In this section, the system model with which CryptoComP can be used is described, with reference to the system block diagram in FIG. 1. The system 100 uses a supervisor/worker setup, where the workers (also referred to herein as worker computation nodes and worker nodes) 104 are assigned sub-tasks 106 for computation and a supervisor (also referred to herein as a supervisor computation node and supervisor node) 102 has access to the inputs of the computation offloaded to the workers 104 as well as the result of computation provided by the workers 104 to the supervisor 102. The supervisor node 102 may be a low-power edge device as described above, although any computing device may be used. Similarly, any device can be used for the worker nodes 104 (e.g., desktops, laptops, servers, etc.), although in some embodiments they are edge computing devices.

In one example, the sub-tasks of computations are linear functions that can be combined to produce the result of a main task 108. For example, the main task 108 may be a multiplication of a matrix A with a vector x. The matrix A is divided into a number N of submatrices $A_n$, the number N of submatrices being equal to the number N of workers. Each worker $w_n$ is asked to compute the multiplication of a matrix $A_n$ with vector x, in particular $A_n x$, where $A=(a_{i,j}) \in \mathbb{F}_\psi^{R_n \times C}$, $x=(x_i) \in \mathbb{F}_\psi^{C \times 1}$, and $\mathbb{F}_\psi$ is a finite field. The supervisor has access to $A_n$ and x and is aware of the linear computation assigned to worker $w_n$.

For the worker and attack model, each worker $w_n$, $n \in \mathcal{N}$ (where $\mathcal{N} \triangleq \{1, \ldots, N\}$) multiplies the assigned matrix $A_n$ with vector x and sends the result to the supervisor. The result received from worker $w_n$ as the multiplication result of $A_n x$, is denoted by $y_n$. However, the worker cannot be trusted by the supervisor. In particular, Byzantine attacks are considered, where the malicious worker corrupts the sub-task that is assigned to it, such that $y_n \neq A_n x$. One focus of the solution is to distinguish dishonest workers at the supervisor and remove them from the distributed network system.

Section A2. Detailed Solution

As shown in Keshtkarjahromi et al., cryptographic methods based on homomorphic hash functions are useful and effective in detecting attacks in the distributed matrix-vector multiplication setup detailed in the previous section. The proposed method includes two main integrity check tools. The first is a light-weight integrity tool, which is an integrity check tool based on homomorphic hashing that can detect attacks with low probability with the advantage of low complexity. The second tool is a heavy-weight integrity tool, which is an integrity check tool again based on homomorphic hashing that can detect attacks with high probability but with the cost of high computational complexity. A trade-off between complexity and accuracy can be determined and used to provide a secure method using one or both of these tools.

One benefit of CryptoComP is the capability of detecting malicious workers by having access to the input and the output delivered by these workers. However, a downside of CryptoComP is still high computational complexity required by the supervisor for applying the hash function on the output and input as detailed in Keshtkarjahromi et al. One goal addressed by embodiments described herein is to reduce the computational complexity of compute provenance. This approach involves what is referred to herein as InfoComP. InfoComP is a compute provenance method based on information-theoretic approach that has low complexity. In another embodiment, InfoComP can be mixed with CryptoComP to provide a balance of high compute efficiency and reliable results. The details of InfoComP is provided below.

B. InfoComP. Information-Theoretic Compute Provenance

InfoComP is an information-theoretic compute provenance that is inspired by the information-theoretic threshold secret sharing model, where shares of a secret is distributed among a group of N users such that any $k \leq N$ users can recover the secret but any k−1 users are not able to recover the secret. One feature of this approach is low complexity compared to CryptoComP.

Section B1. System Model

Figure 2:
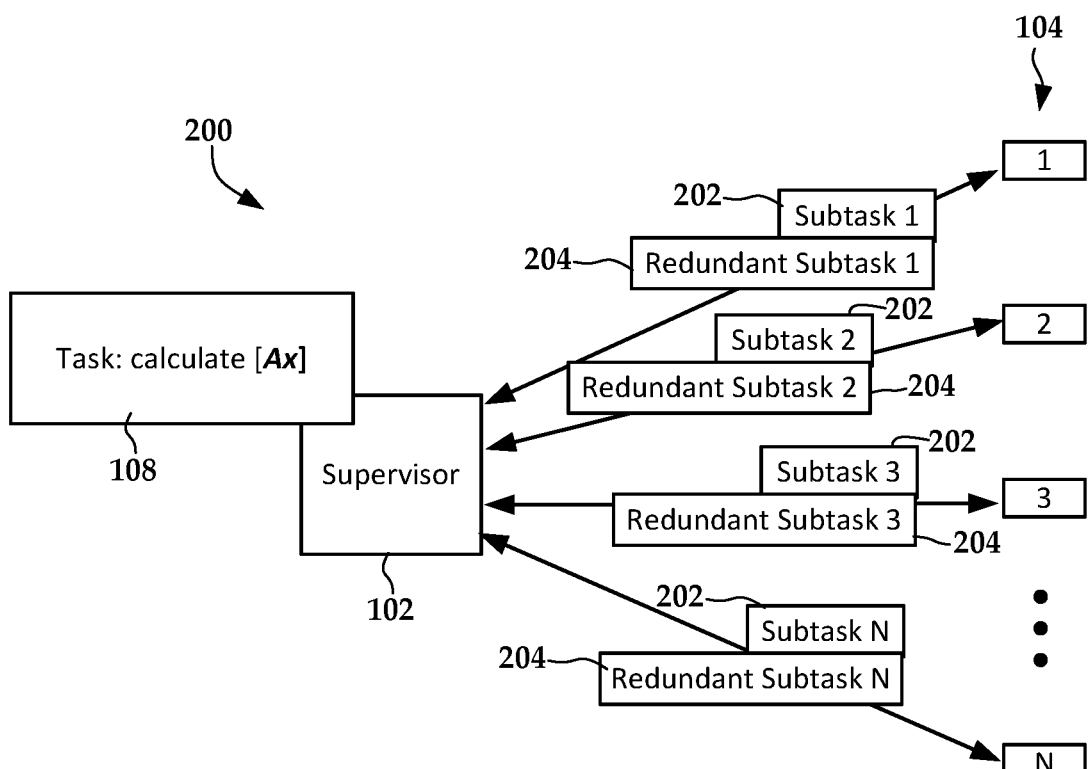

InfoComP can generally be applied to the system 200 shown in FIG. 2 using the same or similar supervisor 102 and workers 104 as shown in FIG. 1. As before, the system includes of a group of N workers 104 (or parties), $w_n$, $n \in \mathcal{N}$ (where $\mathcal{N} \triangleq \{1, \ldots, N\}$) and a supervisor 102. Each worker $w_n$ 104 is assigned to compute some additional redundant sub-task 204 in addition to the original assigned sub-task 202 of $A_n$ multiplying with x. The supervisor 102 has access to the computation results of the assigned original sub-tasks 202 as well as the results of additional redundant sub-tasks 204 belonging to all N workers. As detailed below, InfoComP takes advantage of the redundant sub-tasks 204 over all workers for compute provenance.

Similar to information-theoretic threshold secret sharing model, InfoComP works under the constraint that N workers do not collude. However, this constraint is relaxed as long as at least one of the workers is honest and does not collude with the other malicious workers.

Section B2. Detailed Solution

Figure 3:
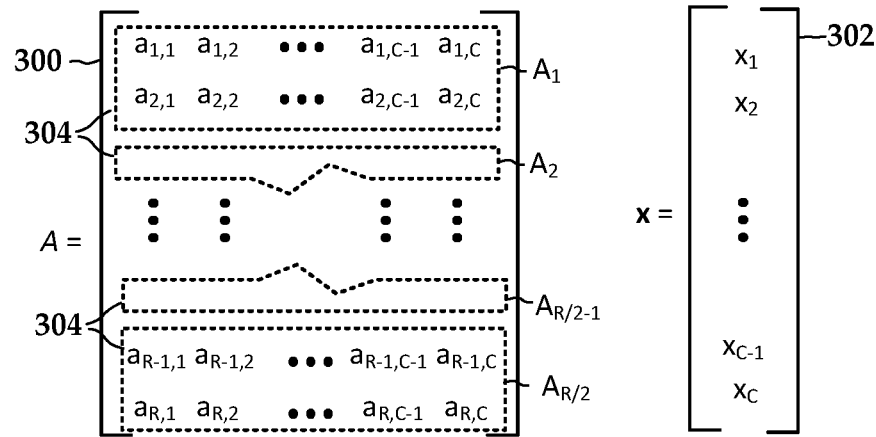
FIG. 3 is a diagram of a matrix multiplication operation according to an example embodiment.

In InfoComP the supervisor 102 sends redundant dependent sub-tasks 204 among workers for computation and confirms the integrity of the workers only if there is consensus among computation results received for dependent sub-tasks 204. The task is a distributed matrix multiplication as shown in FIG. 3, however the detailed solution can be used for any task that involves a linear combination of distributed results. As shown in FIG. 3, the task involves multiplying matrix A 300 with vector x 302. The matrix 300 has R rows and C columns, and is divided into $A_n$ submatrices 304, each having two rows in this example.

Assume $A_n$ includes $R_n$ rows that are assigned to each worker $w_n$, $\forall n \in \mathcal{N}$. In the example shown in FIG. 3, $R_n=2$ and $N=R/2$. The additional redundant sub-task for each worker is generated as a random linear combination of the $R_n$ rows assigned to other workers. More specifically, the redundant sub-task for worker $w_n$ which includes one row that is denoted by $b_n$. The row is generated as $$b_n = \sum_{m=1, m \neq n}^{N} \sum_{i=1}^{R_m} c_{i,m} a_{i,m},$$

where $a_{i,m}$ denotes the ith row of $A_m$ and coefficients $c_{i,m}$ are selected randomly from a finite field. For example, a field of randomly selected integers $\{i_1, i_2, \ldots, i_k\}$ could be used. Increasing the size of the field (e.g., value of k) will increase the complexity of the solution, although provide more protection against attack. The redundant task involves multiplying $b_n$ with x. For the example shown in FIG. 3, $b_1$ sent to the first node $w_1$ would be a random combination of rows 3 to R, with each row being multiplied by random coefficients $c_3$ ($c_{1,2}$ in the equation) to $c_R$ ($c_{2,R/2}$ in the equation). All the coefficients $c_1$ to $c_R$ in this example are retained in memory by the supervisor at least until all the results received from the N workers, as the coefficients will be used to check the computations.

After the supervisor receives the results from all N workers, $y_n$, $\forall n \in \mathcal{N}$ as well as $d_n$ as the result of $b_n x$, it calculates a check value $f_n$, $\forall n \in \mathcal{N}$:

$$f_n = d_n + \sum_{i=1}^{R_n} c_{i,n} y_{i,n} \quad (1)$$

where, $y_{i,n}$ is the ith element of $y_n$. Therefore, if worker $w_n$ and all other workers are honest, such that $y_n = A_n x$, $\forall n \in \mathcal{N}$ and $d_n = b_n x$, then $f_n$ is equal to:

$$f_n = d_n + \sum_{i=1}^{R_n} c_{i,n} y_{i,n} \quad (2)$$

$$= b_n x + \sum_{i=1}^{R_n} c_{i,n} a_{i,n} x \quad (3)$$

$$= \sum_{m=1, m \neq n}^{N} \sum_{i=1}^{R_m} c_{i,m} a_{i,m} x + \sum_{i=1}^{R_n} c_{i,n} a_{i,n} x \quad (4)$$

$$= \sum_{m=1}^{N} \sum_{i=1}^{R_m} c_{i,m} a_{i,m} x \quad (5)$$

From the above equation, if all workers are honest, there is a consensus on the calculated $f_n$'s among all workers $w_n$, $n \in \mathcal{N}$. Therefore, by calculating $f_n$'s and comparing them, the supervisor can check if there is any malicious worker among the N workers or not. Note that if all N workers on which InfoComP is applied, get together and share assigned sub-tasks with each other, they can find the dependencies among the assigned sub-tasks. Then they can corrupt their results such that $f_n$ is still the same for all workers. In this way, the supervisor is fooled and cannot detect the attack. However, if there is at least one honest worker $w_m$ among all the workers and does not collude with all other dishonest workers $w_n$, $n \in \mathcal{N}$, $n \neq m$, calculated $f_m$ is not equal to $f_n$, $n \in \mathcal{N}$, $n \neq m$ and the attack can be detected by the supervisor.

Note that based on the above equations, the check values $f_n$ will agree among the honest workers even if malicious workers corrupt one or both of their own distributed results $y_n$ and redundant result $d_n$. Consider a simple case with three workers, $w_1$, $w_2$, and $w_3$, where $w_3$ is malicious and the others are honest. Also consider the calculation is Ax, where A is a three row matrix with three rows $a_1$, $a_2$, and $a_3$, and x is a vector with rank equal to the number of columns of A. The supervisor calculates the $b_n$ as follows: $b_1 = c_2 a_2 + c_3 a_3$, $b_2 = c_1 a_1 + c_3 a_3$, and $b_3 = c_1 a_1 + c_2 a_2$, where $c_1$, $c_2$, and $c_3$ are random coefficients known only to the supervisor.

The supervisor then sends out three task/subtask requests to worker nodes $w_1$, $w_2$, and $w_3$ represented in this format {computation_task, redundant_subtask}. The requests are to perform the multiplications as follows: $\{a_1 x, b_1 x\}$, $\{a_2 x, b_2 x\}$, $\{a_3 x, b_3 x\}$. The workers return results in the format {distributed_result, redundant_result}, such that the following is respectively returned from worker nodes $w_1$, $w_2$, and $w_3$: $\{y_1, d_1\}$, $\{y_2, d_2\}$, $\{\neg y_3, \neg d_3\}$, where the "¬" symbol indicates a possible corrupted result. Upon receipt of the results, the supervisor calculates the check values from worker nodes $w_1$, $w_2$, and $w_3$ as follows:

$$f_1 = d_1 + c_1 y_1 \quad (6a)$$

$$= b_1 x + c_1 (a_1 x) \quad (6b)$$

$$= (c_2 a_2 + c_3 a_3) x + c_1 a_1 x \quad (6c)$$

$$= (c_1 a_1 + c_2 a_2 + c_3 a_3) x \quad (6d)$$

$$f_2 = d_2 + c_2 y_2 \quad (7a)$$

$$= b_2 x + c_2 (a_2 x) \quad (7b)$$

$$= (c_1 a_1 + c_3 a_3) x + c_2 a_2 x \quad (7c)$$

$$= (c_1 a_1 + c_2 a_2 + c_3 a_3) x \quad (7d)$$

$$f_3 = \neg d_3 + c_3 \neg y_3 \quad (8)$$

In the above, the values in equations (6d) and (7d) agree, so workers $w_1$ and $w_2$ may be considered trustworthy. If $\neg d_3$ is calculated correctly but $\neg y_3$ is not, then $f_3 = c_1 a_1 x + c_2 a_2 x + c_3 \neg y_3$, which is different than $f_1$ and $f_2$. If $\neg y_3$ is calculated correctly but $\neg d_3$ is not, then $f_3 = \neg d_3 + d_3 + c_3 y_3$, which is also different than $f_1$ and $f_2$. It should be apparent by inspection that if both $\neg d_3$ and $\neg y_3$ are calculated incorrectly, then $f_3$ is likely different than $f_1$ and $f_2$.

This example also illustrates how workers can collude to affect the results. If instead of $w_3$ being untrustworthy, assume a case where $w_3$ is trustworthy and $w_1$ and $w_2$ are acting maliciously and colluding. Based on equations (6c) and (7c) above, the malicious workers $w_1$ and $w_2$ have knowledge of $a_1$, $a_2$, $b_1 = (c_2 a_2 + c_3 a_3)$, and $b_2 = (c_1 a_1 + c_3 a_3)$. This results in two equations with four unknowns ($a_3$, $c_1$, $c_2$, $c_3$), which cannot be solved using conventional algebraic techniques. Thus $w_1$ and $w_2$ could construct invalid results $\neg d_1 + c_1 \neg y_1 \neq \neg d_2 + c_2 \neg y_2$ that makes it difficult for the supervisor to distinguish between the trustworthy and malicious workers. However, the supervisor can detect that there is more than one malicious workers. This example shows that even in the case that majority of workers are malicious and colluding with each other, the supervisor can still detect the attack, however, it makes it difficult for the supervisor to distinguish the malicious workers.

In the following, there are two ways from which the supervisor can take advantage of InfoComP. A first way for the supervisor to take advantage of InfoComP, referred to herein as InfoCompP1, is to announce all workers as dishonest if there is no consensus among the workers. The downside of this approach is that there might be some honest workers that will be removed from the network as a result that they are mistakenly announced as dishonest. The second way for the supervisor to take advantage of InfoComP, referred to herein as InfoCompP2, is for the case that the assumption of having more honest workers than dishonest workers is a valid assumption. Note that this assumption is considered in Blockchain networks to provide a consensus among Blockchain nodes.

For this case (InfoCompP2), the supervisor will announce each worker $w_n$ for which the calculated $f_n$ is not equal to the majority of calculated $f_n'$ s, $n \in \mathcal{N}$ as malicious. Note that there are some cases that with even less number of honest workers than the dishonest workers, InfoCompP2 can still detect the attack, as in order for the dishonest workers to reach an agreement and fool the supervisor, they should learn all the packets sent to other workers including the honest workers. Therefore, as long as there are at least two honest workers out of N, InfoCompP2 is successful in detecting malicious workers. Therefore, the assumption of having 50% honest workers for InfoCompP2 to work is the worst case scenario assumption, where N<4. Please refer to the following example for further explanation.

Consider a case with five worker nodes, $w_1$, $w_2$, $w_3$, $w_4$, and $w_5$, where $w_1$, $w_2$, and $w_3$ are malicious and $w_4$, and $w_5$ are honest. If $w_1$, $w_2$, and $w_3$ collude with each other, they can learn about the redundant tasks and the original tasks that are sent to these workers, but, if they cannot learn about the tasks sent to workers $w_4$, and $w_5$, then $f_1$ (e.g., $\neg d_1 + c_1 \neg y_1$), $f_2$ (e.g., $\neg d_2 + c_2 \neg y_2$), and $f_3$ (e.g., $\neg_3 + c_3 \neg y_3$) do not agree such that $f_1 \neq f_2 \neq f_3$. On the other hand, since $w_4$, and $w_5$ are honest $f_4 = f_5$. In this case, the supervisor can still detect the malicious workers by applying the majority rule on the calculated $f_n$'s in InfoCompP2 while majority of workers are malicious.

Note that if a set of maliciously acting worker nodes are removed from the initial set of computing nodes, then a trustworthy set will remain for further computation. In some embodiments, the further computations may involve dividing the original problem again into a number of the trustworthy nodes (which will be smaller than the set of original nodes) and recalculating. In other embodiments, this may involve sending just those original tasks that were sent to the nodes that were found to be malicious to the trustworthy nodes, which may not require using all of the trustworthy nodes. In either of these cases, the further computations may continue to send redundant subtasks to ensure the continued trustworthiness of the remaining nodes.

In the following, the computational complexity and accuracy of InfoComP are described. The size of the field from which the random coefficients $c_{i,m}$, $0<i<R_m$, $m \in \mathcal{N}$ are selected, determines the trade-off between complexity and probability of attack detection in InfoComP. In particular, if the coefficients $c_{i,m}$ are selected from $\{-1, 1\}$, the calculation of $f_n$'s is reduced to addition only, which is negligible. However, with this selection of coefficients, the probability of attack detection is upper-bounded by 50%. While if the coefficients $c_{i,m}$ are selected from a larger field, then the probability of attack detection increases. This improvement is achieved at the cost of an increase in the computation complexity as generating packets $$b_n = \sum_{m=1 m \neq n}^{N} \sum_{i=1}^{R_m} c_{i,m} a_{i,m}$$

and calculating $f_n$'s are no longer multiplication free.

Section C. Comparison Between CryptoComP and InfoComP

It is useful to compare CryptoComP and InfoComP from the viewpoints of constraints on the system model, applications, and complexity. The constraint for CryptoComP is that the supervisor having access to the results of computations performed by the workers, needs to have access to the input of the computations as well. The constraint for InfoComP is that not all workers performing computations should collude with each other. These diverse constraints make CryptoComP and InfoComP applicable to different applications, which are discussed below.

CryptoComP is a compute provenance method that checks the integrity of each worker individually, where the node applying the CryptoComP needs to have access to the input of the computation as well as the result of computation. Then it applies CryptoComP to check the correctness of the result based on the input of the computation. Therefore CryptoComP is applicable in point to point task offloading, where the supervisor needs to compute a computationally-intensive task but it does not have enough computational power and thus it offloads the task to another node, called worker, which might not be trustworthy. In this case, CryptoComP can be used by the supervisor to check the correctness of the computation performed by the worker.

On the other hand, InfoComP is a compute provenance method that checks the integrity of a group of workers, where their computation results are dependent through introducing smart redundancy among the sub-tasks assigned to them. This redundancy can be introduced via interactions among workers (either directly or indirectly through a third party, e.g., a supervisor). Note that InfoComP uses random coefficients for generating the redundant sub-tasks and thus it is applicable in privacy-preserving applications, where workers do not wish to reveal their private data/sub-tasks to other workers. Any supervisor node having access to the computation results of all worker nodes as well as the random coefficients $c_{i,m}$'s (without requiring to know the inputs of the sub-tasks), can approve/disapprove the computations performed by the workers. Therefore, InfoComP is applicable in detecting malicious workers in applications that a group of workers are involved such as multi-party computing or other privacy-preserving distributed computations (e.g., distributed machine learning).

Multi-party computing is a topic in security where a group of nodes interact with each other and collaboratively compute a function of their own data. The interesting feature in multi-party computing is that the parties do not reveal their own private data to each other, but all the nodes can learn about the result of the function. The magic is through the (smart) interactions that are performed among nodes. The design of these interactions is dependent on the function that we want to compute.

Multi-party computing is different from distributed computing from the sense that in distributed computing there is a trusted third party (supervisor) and all nodes interact with the supervisor only, but in multi-party computing a trusted third party is not needed. This is an advantage of multi-party computing over a supervisor/worker setup. InfoComP has the potential to be applied to multi-party computing setup due to its feature of proving the computation without requiring to have access to the original subtasks. For example, in a multi-party computing task, peer nodes may each be acting as supervisor for some computations, and thus selects the random coefficients for its own data that are sent out to other peers. However, the peer node does not reveal its actual data to the other parties (because the data is masked with the random coefficients), and thus its data is kept private even while peer nodes are performing calculations on that data.

Both CryptoComP and InfoComP provide trade-off between complexity and accuracy through random coefficients that are selected from a finite field. The larger the size of the field, the more accurate is the compute provenance method in detecting malicious workers, but the computational cost also increases. However, in general CryptoComP requires more complexity than InfoComP, as it requires the supervisor to compute hash functions which are known for high computational cost.

Based on the comparison between CryptoComP and InfoComP provided in this section, a mixed protocol combining the two can be used to provide an end-to-end secure system in some applications. One of these applications is provided below as an example.

Section D. CryptoInfoComP: A Mixed Cryptographic and Information-Theoretic Compute Provenance for Distributed Matrix Vector Multiplication Generally, CrypoInfoComP is designed as a mixture of CryptoComP and InfoComP for distributed matrix-vector multiplication.

Section D1. System Model

Consider a supervisor/worker setup, where the supervisor needs to perform a computationally intensive task, but it does not have enough computational power. Therefore, it divides the task into sub-tasks and offloads them to workers $w_n$, $n \in \mathcal{N}$ (where $\mathcal{N} \triangleq \{1, \ldots, N\}$), where the sub-tasks will be processed in parallel. For purposes of illustration, the problem solved in this example is a computation of linear functions, e.g., the supervisor would like to compute the multiplication of matrix A (with size R×C) with vector x (with size C×1), Ax. This is shown by way of example in FIG. 3, with matrix 300 and vector 302. The offloaded sub-matrices to workers can be either (i) the original sub-matrix comprising individual rows, or (ii) sub-matrix comprising coded rows, where coding is applied on rows of the original matrix A to generate coded rows. This falls under the new research area of Coded Computation that addresses the problem of delayed or failed workers, see, e.g., Keshtkarjahromi et al.

Figure 4:
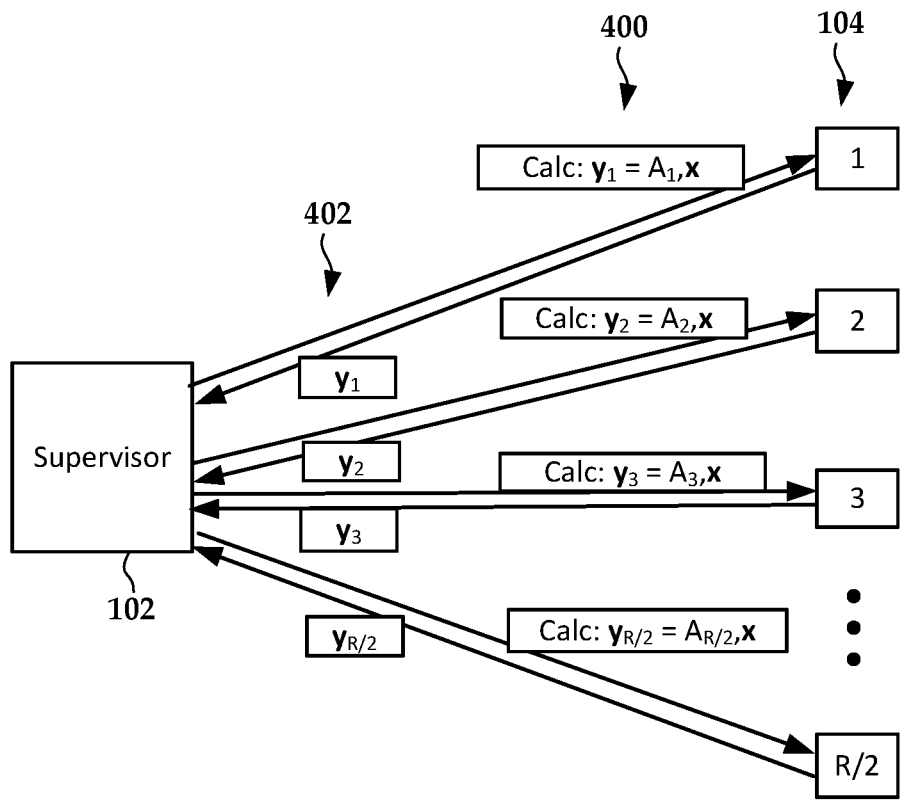
FIG. 4 is a diagram of a distributed problem being solved by a system according to an example embodiment.

The supervisor divides matrix A into N sub-matrices row-wise, denoted by $A_n$, where the size of $A_n$ is $R_n \times C$. In the simplified example shown in FIG. 3, the matrix 300 is divided into R/2 submatrices 304. Unlike the illustrated example, C>>N in a typical implementation, such that each sub-matrix could have hundreds of rows. As shown in FIG. 4, the supervisor then offloads each sub-matrix 400 along with vector x to workers 104 $w_n$, $n \in \mathcal{N}$. This offloading includes an instruction to calculate $A_n x$.

Each worker 104 $w_n$, $n \in \mathcal{N}$ multiplies the received sub-matrix $A_n$ with vector x and sends the results 402 back to the supervisor 102. The packet 402 received from worker $w_n$ as the multiplication result of $A_n x$, is denoted by $y_n$.

The workers may have different computation and communication specifications that may change with time resulting in a heterogeneous and time-varying environment. Therefore, optimum task offloading methods can be applied, which may result in different number of offloaded packets for different workers. In general $R_n = R_m$ may not be necessarily satisfied for $m \neq n$. Moreover, the workers cannot be trusted by the supervisor. In particular, Byzantine attacks are considered, where one or more workers can corrupt the tasks that are assigned to them, e.g., there are some dishonest workers $w_n$ for which $y_n \neq A_n x$. The focus of this work is to distinguish such dishonest workers at the supervisor and remove them from the distributed network system.

Section D2. Detailed Solution.

The goal is to provide a compute provenance method for the supervisor to check the correctness of each computation result it receives from workers. One main constraint in system setup detailed above is that the computational complexity of the compute provenance should be low, as otherwise it obsoletes the benefit of computation offloading from supervisor to workers. In Keshtkarjahromi et al., the authors propose LW and HW integrity check tools, that uses CryptoComP with random coefficients selected from the field $\{-1, 1\}$ and a larger field $\mathbb{F}_q$. LW has lower computational complexity compared to HW, but it has lower accuracy in detecting attacks. The authors also propose a compute provenance method that switches between LW and HW efficiently. Although their proposed compute provenance method is shown to have lower complexity compared to the original matrix vector multiplication, it is desired to reduce complexity of compute provenance more so that the computational power of the supervisor is saved more. In this section, the proposed CryptoInfoComP takes advantage of InfoComP combined with CryptoComP to reduce the complexity.

As mentioned above, CryptoComP does not impose any constraint on the number of colluding malicious workers. However, its complexity is higher than InfoComP mainly due to computing the hash functions. On the other hand, the supervisor can use InfoComP to find out if the workers have an agreement on the correct value of $f_n$ or not and announce each worker $w_n$ with a different value of $f_n$ than the majority of $f_n$'s as malicious. In addition, the random coefficients and thus the redundant dependent sub-tasks of $b_n$'s can be determined by the supervisor and offloaded to workers. With this approach, there is no way that the workers can fool the supervisor through these redundant tasks. However, the constraint to reach a consensus on the correct value of $f_n$ is that the number of honest workers should be large enough. In CryptoInfoComP, these trade-offs are leveraged to develop a computationally efficient algorithm to detect corrupted workers for the distributed matrix vector multiplication setup.

Figure 5:
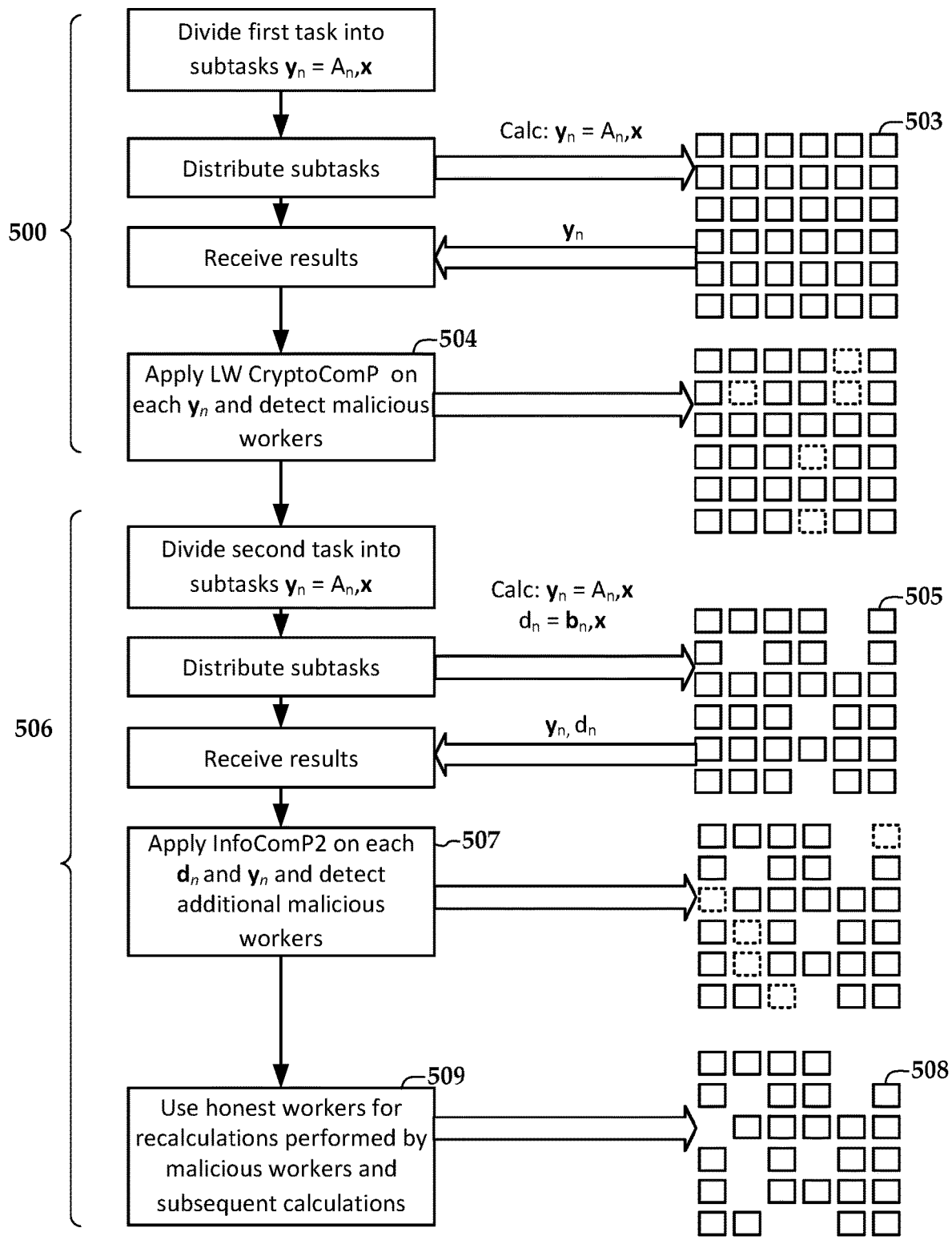
FIG. 5 is a flowchart and diagram of a distributed problem solution according to an example embodiment.

The proposed method includes several layers, as shown in FIG. 5. In the first layer 500, an initial computation is divided into a plurality of initial computation tasks, a number of the initial computation tasks being equal to a number of the plurality of computing nodes. The initial computation tasks are sent to an initial plurality of computing nodes 503, the plurality of computing nodes 503 performing the initial computation tasks to obtain initial results. The supervisor applies a hash function on the data in the original tasks sent to each worker to obtain a first result. The supervisor compares the first result with a second result obtained by applying the hash function to the received results from each worker. The identification of the remaining worker nodes 505 is based on the respective homomorphic hash function results validating the trustworthiness of the worker nodes.

In this example, LW CryptoComP can be applied 504 on each $y_n$ received from each worker $w_n$ of the initial set of workers 503. The probability of attack detection with LW CryptoComP is at least 50%, therefore after the first layer 500 is completed 50% of malicious workers are detected (indicated in FIG. 5 by boxes drawn with dotted lines). Then the set 505 of workers for which no attack is detected, are passed to the next layer 506 that uses InfoComP2 applied on $y_n$'s and $d_n$'s.

In this layer 506, second distributed calculations are performed with the worker nodes 505. The second distributed calculation involves dividing the second distributed calculation into plurality of computation tasks. Each of the worker nodes is sent one of the computation tasks and a redundant subtask. Each redundant subtask for each worker includes a random linear combination of the computation tasks sent to others of the worker nodes. Redundant results are received in response to the redundant subtasks and distributed results in response to the computation tasks. For each of the worker nodes 505, combining the redundant result of the worker node with the distributed results for others of the worker nodes to determine whether the worker node is acting maliciously. The worker computation nodes that are acting maliciously are removed from performing further computations, as indicated by remaining workers 508.

The logic behind layer 506 is that 50% of the malicious workers are detected by layer 500 and thus it is a reasonable assumption that the number of honest workers is large enough for InfoComP2 to be successful. After layer 506, the workers 508 that are not detected as malicious, are the potential honest workers and can be used for subsequent calculations 509 as well as recalculations performed by malicious workers.

Depending on the number of these workers 508, CryptoComP (HW or LW) or InfoComP can be used to detect any remaining malicious workers and use the honest workers in these calculations 509. Both HW CryptoComP and InfoComP with coefficients from a large field have high probability of attack detection but the computational complexity is also high, so may be possible to use them on a small number of potential honest workers 508 to confirm their honesty. If the number of such workers 508 is still large after the first and second layers 500, 506, LW CryptoComP or another round of InfoComP2 can be used with coefficients from small field to filter out more malicious workers.

Figure 6:
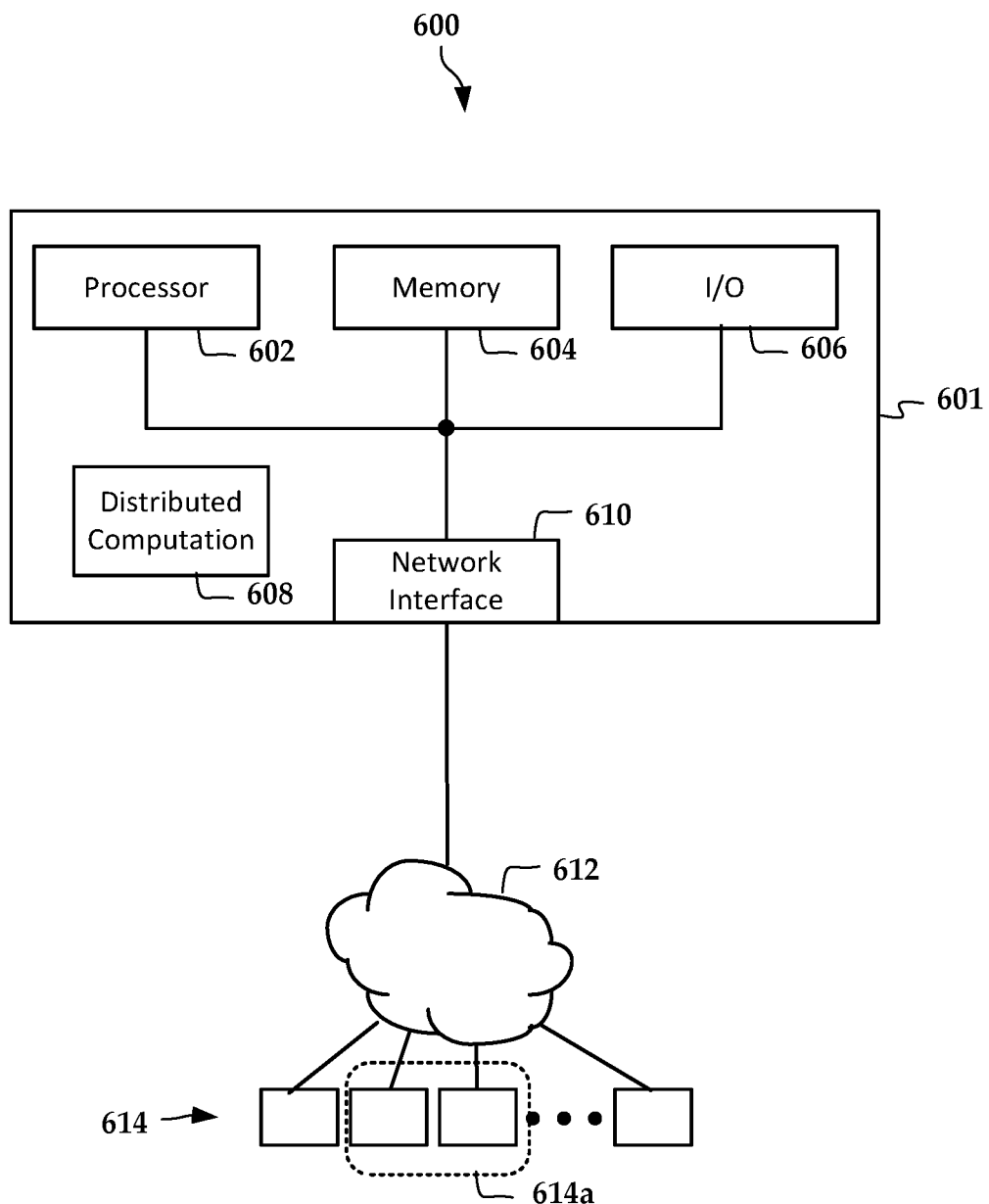
FIG. 6 is a block diagram of a system and apparatus according to an example embodiment.

In FIG. 6, a block diagram illustrates a system 600 according to an example embodiment. The system 600 includes an apparatus 601 may be configured as a supervisor computing node as described above. The supervisor computing node 601 is coupled to one or more networks 612 where it can communicate with a plurality of worker computation nodes 614.

The supervisor computing node 601 includes a processor 602 (e.g., CPU), memory 604, and input/output circuitry 606. The memory 604 may include both volatile memory (e.g., RAM) and non-volatile memory (e.g., flash memory, magnetic storage) and may store instructions 608, which in this case facilitates distributed computation via the networks 612. The supervisor computing node 601 has a network interface 610 that is used for accessing the networks 612. The worker computation nodes 614 may have similar hardware as the supervisor computing node 601.

The instructions 608 are operable to cause the processor 602 to divide a computation into N-computation tasks, where N is the number of worker nodes 614. For each computation task, the processor forms a redundant subtask that is a random linear combination of the other computation tasks. The worker computation nodes 614 are coupled to the one or more networks 612. The worker computation nodes 614 have hardware (e.g., CPU, memory) that are each operable via instructions to receive one of the computation tasks from the supervisor computing node and calculate a distributed result in response thereto. The worker computation nodes 614 are also operable to receive one of the redundant subtasks that is associated with the one computation task and calculate a redundant result in response thereto.

The supervisor computing node 601 is further operable to combine the distributed results with the redundant results for each of the N worker computation nodes to determine that one or more of the worker computation nodes 614a are acting maliciously. Based on this determination, the one or more worker computation nodes 614a can be removed from further computations.

Figure 7:
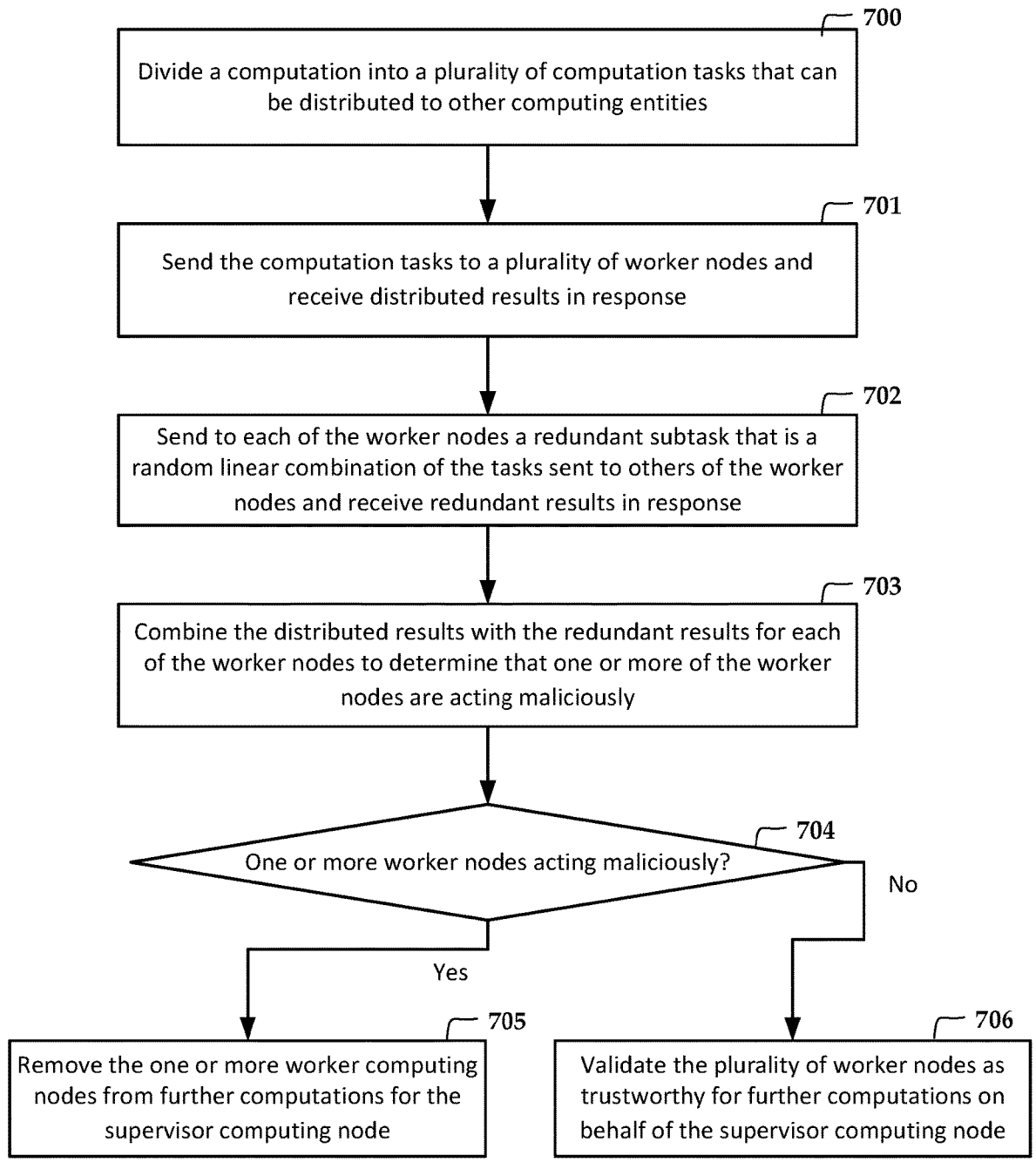
FIG. 7 is a flowchart of a method according to an example embodiment.

In FIG. 7, a flowchart shows a method according to an example embodiment. The method involves, from a supervisor computing node, dividing 700 a computation into a plurality of computation tasks that can be distributed to other computing entities. Distributed results of the computation tasks are recombined at the supervisor computing node to determine a full solution to the computation. The computation tasks are sent 701 to a plurality of worker computation nodes and the distributed results are received in response.

A redundant subtask is sent 702 to each of the worker computation nodes. Each redundant subtask is a random linear combination of the tasks sent to others of the worker computation nodes. The worker nodes produce redundant results that are sent to the supervisor computing node in response to the subtasks. At the supervisor computing node, the distributed results are combined 703 with the redundant results for each of the worker computation nodes to determine that one or more of the worker computation nodes are acting maliciously. Assuming the one or more worker computation nodes that are acting maliciously are found (block 704 returns 'yes'), the one or more worker computation nodes are removed 705 from further computations for the supervisor computing node. Otherwise, the plurality of worker nodes are validated 706 as trustworthy for use in further computations on behalf of the supervisor computing node.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
from a supervisor computing node, dividing a computation into a plurality of computation tasks that can be distributed to other computing entities;
sending the computation tasks to a plurality of worker computation nodes and receiving distributed results in response thereto;
sending to each of the worker computation nodes a redundant subtask that is a random linear combination of the computation tasks sent to others of the worker computation nodes, the worker computation nodes performing the redundant subtasks to produce redundant results that are sent to the supervisor computing node in response thereto;
at the supervisor computing node, for each of the worker computation nodes, combining the redundant result of the worker computation node with the distributed results of the other worker computation nodes;
in response to the combining of the redundant result of the worker computation node with the distributed results of the other worker computation nodes, determining that one or more of the worker computation nodes are acting maliciously; and
removing the one or more worker computation nodes from further computations for the supervisor computing node based on the one or more worker computation nodes acting maliciously.

2. The method of claim 1, wherein the computation comprises a multiplication of a matrix with a vector, the method further comprising dividing the matrix into different sets of rows of the matrix, and wherein the plurality of computation tasks each comprise multiplying one of the different set of rows with the vector.

3. The method of claim 2, further comprising assigning a random coefficient to each row of the matrix, and wherein forming the random linear combination of the tasks sent to each worker computation node $w_n$ comprises:
multiplying each of the rows $a_{i,m}$ sent to the other worker computation nodes $w_m$, $m \neq n$ by a respective random coefficient $c_{i,m}$ to obtain $c_{i,m} a_{i,m}$; and
summing the $c_{i,m} a_{i,m}$ to obtain a single row $b_n$, the redundant result for $w_n$ comprising $b_n$ multiplied with the vector.

4. The method of claim 3, where the random coefficients are selected from a finite field of size k, and wherein a complexity of combining the distributed results with the redundant results increases with k, and a probability of determining that one or more of the worker computation nodes are acting maliciously increases with k.

5. The method of claim 3, wherein combining the distributed results with the redundant results comprises, for each worker computation node $w_n$:
determining, for each $y_{i,n}$ of the distributed results received from $w_n$, an associated random coefficient $c_{i,n}$ that was associated with rows $a_{i,n}$ sent to $w_n$, wherein $y_{i,n}$ equals $a_{i,n}$ times the vector;
multiplying each $y_{i,n}$ with the associated random coefficient $c_{i,n}$, and adding all of the $c_{i,n} y_{i,n}$ to obtain a sum; and
adding the sum to the redundant result from $w_n$ to obtain a check value for $w_n$.

6. The method of claim 5, wherein removing the one or more worker computation nodes from further computations comprises removing those worker computation nodes whose calculated check values does not agree with the check values of a majority of the worker computation nodes.

7. The method of claim 1, wherein removing the one or more worker computation nodes from the further computations comprises removing all of the plurality of worker computation nodes from the further computations.

8. The method of claim 1, wherein the plurality of worker computation nodes is selected from a plurality of available nodes by:
from the supervisor computing node, dividing an initial computation into a plurality of initial computation tasks;
sending each of the initial computation tasks to respective ones of the available nodes, the available nodes performing the initial computation tasks to obtain respective initial results; and
at the supervisor computing node, determining, for each available node, a first result of a homomorphic hash function applied to the available node's initial computation task and a second result of the homomorphic hash function applied to the available node's initial results, the worker computation nodes selected from those available nodes for which the first result matches the second result.

9. The method of claim 1, wherein removal of the one or more worker computation nodes from further computations results in a trustworthy set of the plurality of worker computation nodes, the further computations comprising:
distributing the computation into a second plurality of computation tasks corresponding to a number of the trustworthy set and receiving second distributed results in response thereto; and
combining the second distributed results into a full solution to the computation.

10. The method of claim 1, wherein removal of the one or more worker computation nodes from further computations results in a trustworthy set of the plurality of worker computation nodes, the further computations comprising:
distributing to the trustworthy set those computation tasks originally performed by the one or more worker computation nodes found to be acting maliciously and receiving second distributed results in response thereto; and
combining the second distributed results with the distributed results initially received from the trustworthy set to obtain a full solution to the computation.

11. A non-transitory computer readable medium storing instructions executable by one or more processors to perform the method of claim 1.

12. A method, comprising:
from a supervisor computing node, dividing a matrix into a plurality of submatrices $A_n$ each targeted for a respective one of a plurality of worker computation nodes for multiplication with a vector x;
assigning a random coefficient $c_i$ to each row $a_i$ of the matrix by the supervisor node;
for each node $w_n$ of the worker computation nodes, performing at the supervisor node:
using the random coefficients, forming a random linear combination $b_n$ of rows of the submatrices $A_m$ sent to others of the worker computation nodes $w_m$, $m \neq n$;
sending to the node $w_n$ the $A_n$, the $b_n$, and the vector x;

instructing the node $w_n$ to multiply $A_n$ with the vector x to obtain a distributed result $y_n$, and to multiply $b_n$ with x to obtain a redundant result $d_n$;

receiving the $y_n$ and the $d_n$ from $w_n$; and combining the $d_n$ with the $y_n$ to obtain a check value $f_n$ for $w_n$; and based on the respective check values the plurality of worker computation nodes agreeing with one another, validating the plurality of worker computation nodes as trustworthy for further computations on behalf of the supervisor computing node.

13. The method of claim 12, wherein for each work $w_n$, combining the $d_n$ with the results $y_n$ to obtain the check value $f_n$ comprises:

determining, for each $y_n$ of the distributed results received from $w_n$, the associated random coefficient $c_{i,n}$ that was associated with rows of $A_n$ sent to $w_n$, wherein $y_n$ equals $A_n$ times the vector x;

multiplying each result $y_n$ with the associated random coefficients $c_{i,n}$, and adding all of the $c_{i,n}y_{i,n}$ to obtain a sum, the $y_{i,n}$ being $i^{th}$ elements of $y_n$; and adding the sum to the redundant result $d_n$ to obtain $f_n$.

14. The method of claim 12, further comprising, based on at least one of the check values disagreeing with another of the check values, removing one or more worker computation nodes associated with the at least one check values from further computations on behalf of the supervisor computing node, wherein removing the one or more worker computation nodes from further computations comprises removing those worker computation nodes whose calculated check values do not agree with the check values of a majority of the worker computation nodes.

15. The method of claim 12, further comprising, based on at least one of the check values disagreeing with another of the check values, removing one or more worker computation nodes associated with the at least one check values from further computations on behalf of the supervisor computing node, wherein removing the one or more worker computation nodes from further computations comprises removing all of the plurality of worker computation nodes from further computations.

16. The method of claim 12, wherein the plurality of worker computation nodes is selected from a plurality of available nodes by:

from the supervisor computing node, dividing an initial computation into a plurality of initial computation tasks;

sending each of the initial computation tasks to respective ones of the available nodes, the available nodes performing the initial computation tasks to obtain respective initial results; and at the supervisor computing node, determining, for each available node, a first result of a homomorphic hash function applied to the available node's initial computation task and a second result of the homomorphic hash function applied to the available node's initial results, the worker computation nodes selected from those available nodes for which the first result matches the second result.

17. The method of claim 12, where the random coefficients are selected from a finite field of size k, and wherein a complexity of combining the distributed results with the redundant results increases with k, and a probability of determining that one or more of the worker computation nodes are acting maliciously increases with k.

18. A method comprising:

selecting worker nodes from a plurality of computing nodes based on a first distributed calculation, the first distributed calculation comprising:

dividing an initial computation into a plurality of initial computation tasks, a number of the initial computation tasks being equal to a number of the plurality of computing nodes;

sending the initial computation tasks to the plurality of computing nodes, the plurality of computing nodes performing the initial computation tasks to obtain respective initial results;

for each computing node of the plurality of computing nodes, determining a first result of a homomorphic hash function applied to each computing node's initial computation task and a second result of the homomorphic hash function applied to each computing node's initial results; and selecting the worker nodes from those computing nodes for which the first result matches the second result; and performing a second distributed calculation with the worker nodes, the second distributed calculation comprising:

dividing the second distributed calculation into plurality of computation tasks;

sending, to each of the worker nodes, one of the computation tasks and a redundant subtask, each redundant subtask for each worker comprising a random linear combination of the computation tasks sent to others of the worker nodes;

receiving redundant results in response to the redundant subtasks and distributed results in response to the computation tasks;

for each of the worker nodes, combining the redundant result of the worker node with the distributed result of the others of the worker nodes;

in response to the combining of the redundant result of each worker node with the distributed result of others of the worker nodes, determining whether the worker node is acting maliciously; and removing the worker computation nodes that are acting maliciously from performing further computations.

19. The method of claim 18, where a probability of attack detection with first distributed calculation is at least 50%.

20. The method of claim 18, wherein the redundant subtask for each worker node comprises a random combination of the computation tasks sent to others of the worker nodes, and wherein random coefficients used to form the random combinations are selected from a field of $\{-1, 1\}$ such that no multiplication is required to determine the random subtask and to combine the redundant result of the worker node with the distributed results for others of the worker nodes.

* * * * *